Nov. 14, 1933. H. J. PETERSON Re. 19,002

CABLE TERMINAL SHIELD

Original Filed Feb. 13, 1930

Inventor

Horton J. Peterson.

By Geo. Stevens.

Attorney

Reissued Nov. 14, 1933

Re. 19,002

UNITED STATES PATENT OFFICE 19,002

CABLE TERMINAL SHIELD

Horton J. Peterson, Virginia, Minn.

Original No. 1,869,863, dated August 2, 1932, Serial No. 428,212, February 13, 1930. Application for reissue June 28, 1933. Serial No. 678,100

4 Claims. (Cl. 247—2)

Figure 1:
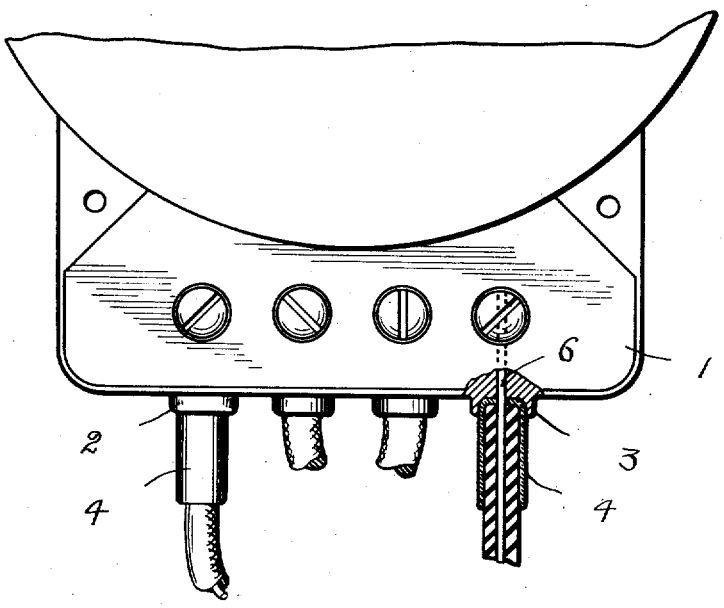

This invention relates to safety terminal connections for electric meters, and refers particularly to novel means for assuring against the theft of current adjacent the terminal connections of such meters, the principal object of which is obvious, and another object being that of providing a simple insulating shield adjacent an electric wire terminal.

Other objects and advantages of the invention will appear in the following description thereof.

Figure 2:
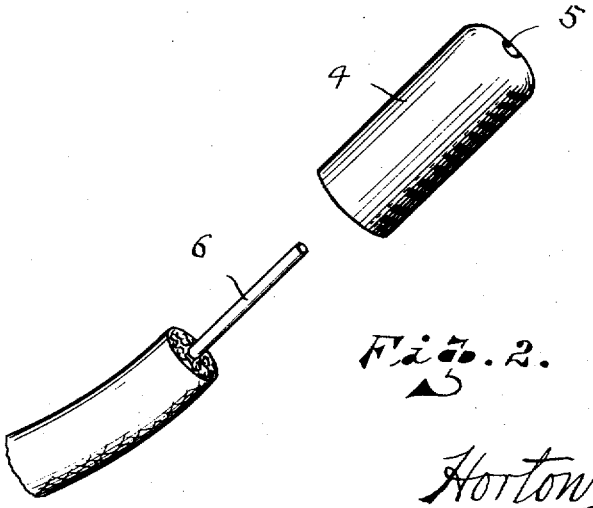

Referring now to the accompanying drawing, wherein like reference characters indicate like parts:

Figure 1 is a plan view of the terminal chamber of an electric meter showing the feed wire terminals to the meter as being equipped with the insulated tip, one of which is shown in section; and Figure 2 is a perspective view of a disassembled tip and wire.

1 represents the terminal chamber of the meter which is provided with the usual four terminal flanged sockets 2 for the input and output connections.

It is well known that the electric current to such meters is frequently bypassed by a short piece of wire being tucked into one of the flanged sockets 2 at one end and into the socket 3 at the opposite end so as to engage the unshielded portion of the wire in such sockets.

In the ordinary construction of meter such unauthorized practice becomes very simple as there is invariably space about the end of the insulation of such wires for readily slipping a shunt wire into the socket where it is readily held by impingement against that portion of the terminal wire which is uninsulated.

To prevent such practice I have provided preferably a glass shield of thimble-like form indicated at 4 though of course this may be made of other non-conductive material, but glass has the added advantage of being readily detected if fractured or broken for such practice; the same to fit snugly over the wire being used for feeding current into the meter. A hole 5 is provided in the end of the shield 4 for protrusion of the naked portion 6 of the wire, or that from which the insulation has prevoiusly been removed, so that no alteration in the meter chamber is required, however the shield 4 is of a size to snugly fit within the annular flange 2 or 3 provided about such terminal connections. The shields are of sufficient length to extend considerably beyond the flanges of the chambers so that it becomes practically impossible to insert a wire through or past the insulation as commonly practiced without breaking the terminal shield.

I am aware that somewhat similar appearing terminals are old in the art but are formed in cooperative combination with a novel form of conductor needle or point, they being for the purpose of increasing and assuring positive conductivity, and in no instance showing an insulated shield as that contemplated in my present invention.

Having thus described my invention, what I claim and desire to secure by Letters Patent, is:

1. The combination with an electric meter casing having a plurality of flanged terminal sockets formed therein through which the supply wires make contact with the meter, of an elongated breakable thimble-like shield snugly fitting over the end of the insulation of the supply wire and tightly fitting the socket, said thimble having a substantially flat end provided with a hole through which a bare end of the wire may pass with a snug fit.

2. In combination, a meter terminal housing having flanged cup-like holes for the reception of the feed wires to the meter and a fragile insulating thimble having a substantially flat end upon the wire terminals, said thimbles fitting snugly into the cup-like holes and tightly over the insulation of the wire, and having a hole in said end through which only the bared portion of the feed wire passes with a snug fit for making contact with the meter.

3. The combination with an insulated electric feed wire, the insulation adjacent the end thereof having been removed for making an electrical contact, of an elongated frangible thimble having a substantially flat end provided with a hole therethrough; said thimble being adapted to snugly fit over the insulation and the bared portion of the wire pass through the hole with substantially a snug fit.

4. The combination with an insulated electric feed wire, the insulation adjacent the end thereof having been removed for making an electrical contact, of an elongated thimble of non-conducting material having a substantially flat end provided with a hole therethrough and adapted to snugly fit over the insulation and the bared portion of the wire pass through the hole with substantially a snug fit.

HORTON J. PETERSON.